US012709569B2

(12) United States Patent
Nakayama et al.

(10) Patent No.: US 12,709,569 B2
(45) Date of Patent: Aug. 18, 2026

(54) FIBER OPTICS PLATE, SCINTILLATOR PANEL, RADIATION DETECTOR, ELECTRON MICROSCOPE, X-RAY BLOCKING METHOD AND ELECTRON BEAM BLOCKING METHOD

(71) Applicant: HAMAMATSU PHOTONICS K.K., Hamamatsu (JP)

(72) Inventors: Tomoyuki Nakayama, Hamamatsu (JP); Takuya Sakai, Hamamatsu (JP); Kosuke Tomita, Hamamatsu (JP); Yoshinori Yamamoto, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 989 days.

(21) Appl. No.: 17/763,856

(22) PCT Filed: Aug. 31, 2020

(86) PCT No.: PCT/JP2020/032868
§ 371 (c)(1),
(2) Date: Mar. 25, 2022

(87) PCT Pub. No.: WO2021/065284
PCT Pub. Date: Apr. 8, 2021

(65) Prior Publication Data

US 2022/0340480 A1 Oct. 27, 2022

(30) Foreign Application Priority Data

Sep. 30, 2019 (JP) ................................ 2019-179779

(51) Int. Cl.
*C03C 13/04* (2006.01)
*C03C 3/068* (2006.01)
(Continued)

(52) U.S. Cl.
CPC ............ *C03C 13/046* (2013.01); *C03C 3/068* (2013.01); *C03C 3/155* (2013.01); *C09K 11/616* (2013.01);
(Continued)

(58) Field of Classification Search
CPC ....... C03C 13/046; C03C 3/068; C03C 3/155; C03C 2213/00; C03C 4/087;
(Continued)

(56) References Cited

U.S. PATENT DOCUMENTS 5,065,029 A * 11/1991 Krivanek ................ H01J 37/18 850/16
2006/0088269 A1* 4/2006 Higby .................. C03C 13/046 385/142
(Continued)

FOREIGN PATENT DOCUMENTS

CN 102190438 A 9/2011
JP H09-071436 A 3/1997
(Continued)

OTHER PUBLICATIONS

English Translation of JP2008088021A from Espacenet (Year: 2008).*
(Continued)

*Primary Examiner* — David E Smith
*Assistant Examiner* — Laura Eloise Tandy
(74) *Attorney, Agent, or Firm* — FAEGRE DRINKER BIDDLE & REATH LLP

(57) ABSTRACT

A fiber optic plate 122 including a plurality of core glasses **122*a*, a clad glass 122*b* covering the core glass 122*a*, and a light-absorbing glass 122*c* disposed between the plurality of core glasses 122*a*, wherein a content of $TiO_2$ in the core glass 122*a*** is 7% by mass or less, a content of $B_2O_3$ in the
(Continued)

core glass **122*a* is 15% by mass or more, and a content of $WO_3$ in the core glass 122*a*** is more than 0% by mass.

13 Claims, 4 Drawing Sheets

(51) Int. Cl.

| | |
|---|---|
| ***C03C 3/155*** | (2006.01) |
| ***C03C 4/00*** | (2006.01) |
| ***C03C 4/08*** | (2006.01) |
| ***C09K 11/61*** | (2006.01) |
| ***G01N 23/06*** | (2018.01) |
| ***G01T 1/20*** | (2006.01) |
| ***G02B 6/08*** | (2006.01) |
| ***H01J 37/26*** | (2006.01) |

(52) U.S. Cl.
CPC ........... *G01N 23/06* (2013.01); *G01T 1/2018* (2013.01); *C03C 2213/00* (2013.01); *G01N 2223/04* (2013.01); *G01N 2223/505* (2013.01)

(58) Field of Classification Search
CPC ....... C03C 13/048; C03C 13/045; C03C 4/00; C09K 11/616; G01N 23/06; G01N 2223/04; G01N 2223/505; G01T 1/2018; G01T 1/20; H01J 2237/2443; H01J 2237/2445; H01J 2237/2446; H01J 37/26; G02B 6/08
See application file for complete search history.

(56) References Cited

U.S. PATENT DOCUMENTS

2011/0223323 A1* 9/2011 Ohashi .................... G21K 4/00 427/157
2013/0087713 A1* 4/2013 Toyama ................ G01T 1/2002 250/487.1
2014/0376868 A1* 12/2014 Ritter ...................... C03C 3/066 423/618

FOREIGN PATENT DOCUMENTS

JP H09145940 A * 6/1997
JP H10-199463 A 7/1998
JP 2001-064038 A 3/2001
JP 2001-213636 A 8/2001
JP 2002-333480 A 11/2002
JP 2004-292301 A 10/2004
JP 2007-121506 A 5/2007
JP 2008088021 A * 4/2008 ............ C03C 3/068
JP 2008-197377 A 8/2008
JP 2011-116621 A 6/2011
JP 2012-229148 A 11/2012
JP 2013-029356 A 2/2013
JP 2016-008146 A 1/2016
JP 2017-007943 A 1/2017
WO WO 02/037138 A1 5/2002

OTHER PUBLICATIONS

English Translation of JP2008088021A (Year: 2008).*
English Translation of JPH09145940A (Year: 1997).*
International Preliminary Report on Patentability mailed Apr. 14, 2022 for PCT/JP2020/032868.

* cited by examiner

FIBER OPTICS PLATE, SCINTILLATOR PANEL, RADIATION DETECTOR, ELECTRON MICROSCOPE, X-RAY BLOCKING METHOD AND ELECTRON BEAM BLOCKING METHOD

TECHNICAL FIELD

The present invention relates to a fiber optic plate, a scintillator panel, a radiation detector, an electron microscope, an X-ray blocking method, and an electron beam blocking method.

BACKGROUND ART

A fiber optic plate (also known as a fiber face plate aggregate or a fiber bundle plate aggregate; for example, trade name J11057 manufactured by HAMAMATSU PHOTONICS K.K.) is an optical device configured by bundling a plurality of optical fibers together, and the fiber optic plate can be used in various optical devices. The fiber optic plate includes, for example, a plurality of core glasses, a clad glass covering the core glass, and a light-absorbing glass disposed between the plurality of core glasses, and various compositions of a glass composition used for the core glass are considered (for example, refer to Patent Literature 1 below).

CITATION LIST

Patent Literature

Patent Literature 1: Japanese Unexamined Patent Publication No. H9-71436

SUMMARY OF INVENTION

Technical Problem

With respect to the glass composition used for the core glass of the fiber optic plate, from the viewpoint of ensuring excellent performance in an optical device, an appropriate refractive index is required while suppressing coloration.

One aspect of the present invention is to provide a fiber optic plate including a core glass having a low degree of coloration and an appropriate refractive index. Another aspect of the invention is to provide a scintillator panel including the above-described fiber optic plate. Another aspect of the present invention is to provide a radiation detector and an electron microscope including the above-described scintillator panel. Another aspect of the present invention is to provide an X-ray blocking method and an electron beam blocking method using the above-described fiber optic plate.

Solution to Problem

In recent years, digital imaging is performed by irradiation with radiation from the side of an object (subject, imaging object, inspection object, or the like) toward an imaging device in a state where a scintillator panel including a fiber optic plate and a scintillator is interposed between the object and the imaging device. In this case, when the imaging device is exposed to the radiation, there may be a problem that dark current, noise, or the like increase, a problem that white spots occur in an output image, and the like. For this reason, it is required to improve radiation blocking performance of blocking the radiation while transmitting visible light or the like in the fiber optic plate. On the other hand, the present inventor has studied composition of a glass composition used for a core glass and found a problem that it is not easy to obtain a small degree of coloration and an appropriate refractive index in the core glass while improving radiation blocking performance. Then, the present inventor has found that the problem can be solved when the core glass contains specific components.

One aspect of the present invention is to provide a fiber optic plate including a plurality of core glasses, a clad glass covering the core glass, and a light-absorbing glass disposed between the plurality of core glasses, wherein a content of $TiO_2$ in the core glasses is 7% by mass or less, a content of $B_2O_3$ in the core glass is 15% by mass or more, and a content of $WO_3$ in the core glass is more than 0% by mass.

According to the fiber optic plate of one aspect of the present invention, it is possible to obtain a small degree of coloration and an appropriate refractive index in the core glass. According to such a fiber optic plate, it is possible to ensure excellent performance in an optical device. According to the fiber optic plate of one aspect of the present invention, it is possible to obtain a small degree of coloration and an appropriate refractive index in the core glass while improving radiation blocking performance.

Incidentally, in some cases, in the fiber optic plate used in the field of imaging, lead glass may be used as a glass composition of the core glass. However, since lead is subject to hazardous substance regulations such as RoHS regulation and has a large environmental load, it is required not to use lead glass. In contrast, according to the fiber optic plate of one aspect of the present invention, even when the core glass does not contain lead, it is possible to obtain a small degree of coloration and an appropriate refractive index of the core glass while improving radiation blocking performance.

Another aspect of the present invention provides a scintillator panel including the above-described fiber optic plate and a scintillator disposed on the fiber optic plate.

Another aspect of the present invention provides a radiation detector including: a radiation irradiator; an imaging device; and the above-described scintillator panel, wherein the scintillator panel is disposed between the radiation irradiator and the imaging device, and the scintillator is disposed on the side of the radiation irradiator in the scintillator panel.

Another aspect of the present invention provides an electron microscope including: an electron beam source; an electron optical system irradiating a sample with electron beams emitted from the electron beam source; a sample mounting part holding the sample; the above-described scintillator panel; and an imaging device, wherein the scintillator panel is disposed between the electron beam source and the imaging device, the scintillator is disposed on the side of the electron beam source in the scintillator panel, an electron beam penetrating through or being scattered in the sample among the electron beams is converted into an optical image by the scintillator of the scintillator panel, and the optical image is captured by the imaging device.

Another aspect of the present invention is to provide an X-ray blocking method of blocking at least a portion of X-rays directed to the imaging device by the fiber optic plate, when an object is irradiated with the X-rays from a radiation irradiator in a state where the object is disposed between the radiation irradiator and the scintillator in the above-described radiation detector.

Another aspect of the present invention is to provide an electron beam blocking method of blocking at least a portion of electron beams directed to the imaging device by the fiber optic plate, when an object is irradiated with the electron beams from a radiation irradiator in a state where the object is disposed between the radiation irradiator and the scintillator in the above-described radiation detector.

Advantageous Effects of Invention

According to one aspect of the present invention, it is possible to provide a fiber optic plate including a core glass having a low degree of coloration and an appropriate refractive index. According to another aspect of the present invention, it is possible to provide a scintillator panel including the fiber optic plate. According to another aspect of the present invention, it is possible to provide a radiation detector and an electron microscope including the scintillator panel. According to another aspect of the present invention, it is possible to provide a radiation blocking method using the fiber optic plate, and it is possible to provide an X-ray blocking method and an electron beam blocking method using the fiber optic plate.

DESCRIPTION OF EMBODIMENTS

Figure 1:
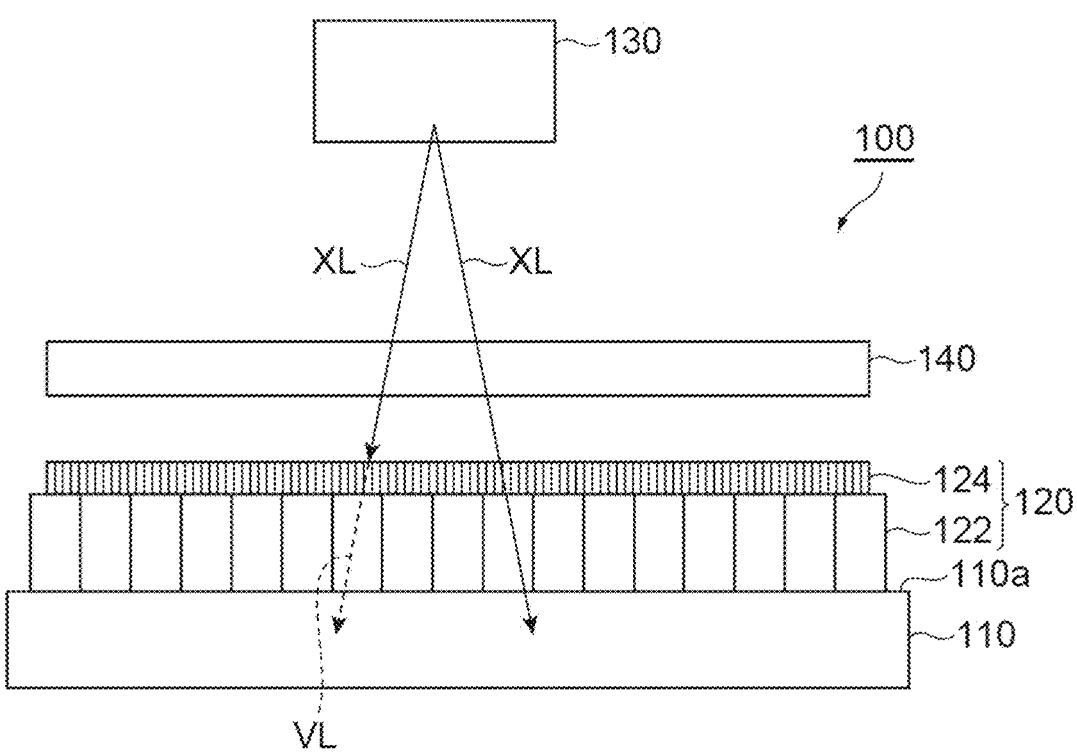
FIG. 1 is a cross-sectional view schematically illustrating a radiation detector of an embodiment of the present invention.

Hereinafter, embodiments for carrying out the present invention will be described in detail with reference to the drawings. It is noted that, in each drawing, the same or corresponding components are denoted by the same reference numerals, and duplicate description will be omitted. The present invention is not limited to the following embodiments.

In the present specification, a numerical range indicated using "to" indicates a range including the numerical values before and after "to" as the minimum value and the maximum value, respectively. In the numerical range described stepwise in the present specification, upper limit values or lower limit values of the numerical range of one step can be arbitrarily combined with upper limit values or lower limit values of the numerical range of another step. In the numerical range described in the present specification, upper limit values or lower limit values of the numerical range may be replaced with the values illustrated in Examples.

A fiber optic plate (FOP) of the present embodiment includes a plurality of core glasses, a clad glass covering the core glass, and a light-absorbing glass disposed between the plurality of core glasses. In the fiber optic plate (glass composition constituting the fiber optic plate) of the present embodiment, a content of $TiO_2$ in the core glass is 7% by mass or less, a content of $B_2O_3$ in the core glass is 15% by mass or more, and a content of $WO_3$ in the core glass is more than 0% by mass.

According to the fiber optic plate of the present embodiment, it is possible to obtain a small degree of coloration and an appropriate refractive index (for example, a d-line refractive index $n_d$ of 1.88 or less) in the core glass. According to such a fiber optic plate, it is possible to ensure excellent performance in an optical device. For example, when the core glass of the fiber optic plate has an appropriate refractive index, the refractive index of the fiber optic plate and the refractive index of the scintillator is likely to be the same, and thus, it is possible to suppress surface reflection at the boundary of the fiber optic plate and the scintillator in the scintillator panel including the fiber optic plate and the scintillator.

According to the fiber optic plate of the present embodiment, it is possible to obtain a small degree of coloration and an appropriate refractive index in the core glass while improving radiation blocking performance (for example, X-ray blocking performance or electron beam blocking performance), and it is possible to selectively block radiations (for example, X-rays or electron beams) while transmitting visible light. According to the fiber optic plate of the present embodiment, since excellent radiation blocking performance can be obtained, when an imaging device is used, it is possible to suppress the occurrence of problems (the increase in dark current, noise, or the like, occurrence of the white spots in the output image, or the like) due to exposure of the imaging device to radiation. According to the fiber optic plate of the present embodiment, even when the core glass does not contain lead, it is possible to obtain a small degree of coloration and an appropriate refractive index of the core glass while improving the radiation blocking performance (for example, X-ray blocking performance or electron beam blocking performance). According to the fiber optic plate of the present embodiment, it is possible to block at least a portion of the radiations, and it is also possible to block all of the radiations.

Incidentally, in order to improve the resolution and the like, it is effective to thin the scintillator of the optical device, however, in some cases, as the thinning is performed, the radiation is likely to penetrate the scintillator and the imaging device is likely to be exposed to radiation. On the other hand, according to the present embodiment, even when the thinning is performed in order to improve the resolution and the like, the radiations (for example, X-rays or electron beams) can be blocked by the fiber optic plate, and thus, it is possible to obtain excellent resolution while suppressing the occurrence of problems caused by exposure of the imaging device to the radiations.

The fiber optic plate of the present embodiment can be used for various optical devices including the fiber optic plate. The fiber optic plate of the present embodiment can have a function of transmitting light or the like incident from an incident surface to an emitting surface and can be used as an optical waveguide for optical devices such as a radiation detector, an electron microscope, an image intensifier, a CCD coupling, and a fingerprint detection device. The radiation detector includes, for example, a radiation imager (X-ray image sensor, X-ray TDI camera, or the like). The radiation detector may be used to detect the radiation in addition to acquiring an image with a radiation imager. According to the present embodiment, it is possible to provide an application of the fiber optic plate for radiation blocking. According to the present embodiment, it is possible to provide a glass composition for radiation blocking. As radiation, electromagnetic radiation such as X-rays and y-rays; and particle radiation such as electron beams are exemplified.

Hereinafter, the constituent components of the core glass and the like will be described. The content of the constituent components of the core glass can be measured, for example, by fluorescent X-ray analysis or ICP emission spectroscopic analysis. As the content of each oxide in the core glass, the content of the oxide as a raw material for compounding can also be used.

From the viewpoint of obtaining a small degree of coloration and an appropriate refractive index while improving radiation blocking performance, the content of $TiO_2$ in the core glass is 7% by mass or less based on the entire core glasses. The core glass may contain $TiO_2$ (the content may be more than 0% by mass) and may not contain $TiO_2$ (the content may be 0% by mass). The content of $TiO_2$ may be 0 to 7% by mass.

The content of $TiO_2$ may be in the following range based on the entire core glasses. From the viewpoint of easily obtaining a small degree of coloration and an appropriate refractive index while improving radiation blocking performance, the content of $TiO_2$ may be 6% by mass or less, 5% by mass or less, 4.5% by mass or less, 4% by mass or less, 3% by mass or less, 2% by mass or less, 1% by mass or less, less than 1% by mass, 0.5% by mass or less, 0.3% by mass or less, 0.1% by mass or less, 0.05% by mass or less, or 0.01% by mass or less. From the viewpoint of easily increasing the refractive index and the viewpoint of easily obtaining excellent devitrification resistance, the content of $TiO_2$ may be 0.00001% by mass or more, 0.0001% by mass or more, or 0.001% by mass or more.

From the viewpoint of obtaining an appropriate refractive index, the viewpoint of easily reducing the linear thermal expansion coefficient, and the viewpoint of easily obtaining excellent devitrification resistance, the content of $B_2O_3$ in the core glass is 15% by mass or more based on the entire core glasses. The content of $B_2O_3$ may be in the following range based on the entire core glasses. From the viewpoint of easily obtaining an appropriate refractive coefficient, the viewpoint of easily further reducing the linear thermal expansion coefficient, the viewpoint of easily reducing a transition point and a yield point, and the viewpoint of easily further obtaining excellent devitrification resistance, the content of $B_2O_3$ may be more than 15% by mass, 15.5% by mass or more, more than 15.5% by mass, 16% by mass or more, 17% by mass or more, 18% by mass or more, more than 18% by mass, or 18.5% by mass or more. From the viewpoint of easily maintaining a high content of other components that contribute to the improvement of radiation blocking performance, the content of $B_2O_3$ may be 33% by mass or less, 31% by mass or less, 30% by mass or less, 28% by mass or less, 25% by mass or less, less than 25% by mass, 23% by mass or less, 22% by mass or less, less than 22% by mass, 21% by mass or less, less than 21% by mass, 20.5% by mass or less, 20% by mass or less, less than 20% by mass, 19.5% by mass or less, 19% by mass or less, less than 19% by mass, or 18.5% by mass or less. From these viewpoints, the content of $B_2O_3$ may be 15 to 33% by mass, 18.5 to 33% by mass, or the like.

From the viewpoint of reducing the degree of coloration while improving radiation blocking performance and the viewpoint of easily increasing the refractive index, the content of $WO_3$ in the core glass is more than 0% by mass based on the entire core glasses. The content of $WO_3$ may be in the following range based on the entire core glasses. From the viewpoint of easily improving the radiation blocking performance and the viewpoint of easily further increasing the refractive index, the content of $WO_3$ may be 1% by mass or more, 2% by mass or more, 3% by mass or more, 5% by mass or more, 7% by mass or more, 9% by mass or more, 10% by mass or more, more than 10% by mass, 11% by mass or more, 12% by mass or more, 12.5% by mass or more, more than 12.5% by mass, 13% by mass or more, 13.5% by mass or more, 14% by mass or more, 14.5% by mass or more, or 15% by mass or more. From the viewpoint of easily reducing the degree of coloration and the viewpoint of easily obtaining excellent devitrification resistance, the content of $WO_3$ may be 25% by mass or less, 22.5% by mass or less, 20% by mass or less, 19% by mass or less 18.5% by mass or less, 18% by mass or less, 17.5% by mass or less, 17% by mass or less, 16.5% by mass or less, 16% by mass or less, 15.5% by mass or less, or 15% by mass or less. From these viewpoints, the content of $WO_3$ may be more than 0% by mass and 25% by mass or less, 10 to 15% by mass, or the like.

The core glass may contain $SiO_2$ (the content may be more than 0% by mass) and may not contain $SiO_2$ (the content may be 0% by mass). The content of $SiO_2$ may be in the following range based on the entire core glasses. From the viewpoint of easily increasing the transition point and the yield point, the content of $SiO_2$ may be 10% by mass or less, less than 10% by mass, 8% by mass or less, 7% by mass or less, 6% by mass or less, less than 6% by mass, 5.5% by mass or less, 5% by mass or less, less than 5% by mass, 4.5% by mass or less, 4% by mass or less, less than 4% by mass, or 3.5% by mass or less. From the viewpoint of easily obtaining excellent devitrification resistance and the viewpoint of easily reducing the linear thermal expansion coefficient, the content of $SiO_2$ may be 0.1% by mass or more, 0.5% by mass or more, 1% by mass or more, more than 1% by mass, 1.5% by mass or more, 2% by mass or more, 2.5% by mass or more, 3% by mass or more, more than 3% by mass, or 3.5% by mass or more. From these viewpoints, the content of $SiO_2$ may be 0 to 10% by mass or the like.

The core glass may contain $Gd_2O_3$ (the content may be more than 0% by mass) and may not contain $Gd_2O_3$ (the content may be 0% by mass). The content of $Gd_2O_3$ may be in the following range based on the entire core glasses. From the viewpoint of easily obtaining excellent devitrification resistance, the content of $Gd_2O_3$ may be 40% by mass or less, 37.5% by mass or less, 35% by mass or less, 33% by mass or less, 30% by mass or less, 28% by mass or less 27.5% by mass or less, 27% by mass or less, 26.5% by mass or less, 26% by mass or less, 25.5% by mass or less, or 25% by mass or less. From the viewpoint of easily improving the radiation blocking performance, the viewpoint of easily increasing the refractive index, and the viewpoint of easily obtaining excellent devitrification resistance, the content of $Gd_2O_3$ may be 0.1% by mass or more, 0.5% by mass or more, 1% by mass or more, 5% by mass or more, 10% by mass or more, 15% by mass or more, 20% by mass or more, 22.5% by mass or more, or 25% by mass or more. From these viewpoints, the content of $Gd_2O_3$ may be 0 to 40% by mass, 0 to 25% by mass, or the like.

The core glass may contain $ZrO_2$ (the content may be more than 0% by mass) and may not contain $ZrO_2$ (the content may be 0% by mass). The content of $ZrO_2$ may be in the following range based on the entire core glasses. From the viewpoint of easily obtaining excellent devitrification resistance, the content of $ZrO_2$ may be 10% by mass or less, 9% by mass or less, 8% by mass or less, 7.5% by mass or less, less than 7.5% by mass, 7% by mass or less, 6% by mass or less, 5.5% by mass or less, 5% by mass or less, 4.5% by mass or less, 4% by mass or less, 3.5% by mass or less, 3% by mass or less, or 2.5% by mass or less. From the viewpoint of easily increasing the refractive index and easily obtaining excellent devitrification resistance, the content of $ZrO_2$ may be 0.1% by mass or more, 0.5% by mass or more, 1% by mass or more, 1.5% by mass or more, 2% by mass or more, more than 2% by mass, 2.2% by mass or more, 2.3% by mass or more, 2.4% by mass or more, or 2.5% by mass or more. From these viewpoints, the content of $ZrO_2$ may be 0 to 10% by mass, 0 to 2.5% by mass, or the like.

The core glass may contain $La_2O_3$ (the content may be more than 0% by mass) and may not contain $La_2O_3$ (the content may be 0% by mass). The content of $La_2O_3$ may be in the following range based on the entire core glasses. From the viewpoint of easily obtaining excellent devitrification resistance, the content of $La_2O_3$ may be 40% by mass or less, less than 40% by mass, 37.5% by mass or less, 35% by mass or less, less than 35% by mass, 33% by mass or less, 32.5% by mass or less, or 32% by mass or less. From the viewpoint of easily improving the radiation blocking performance and the viewpoint of increasing the refractive index, the content of $La_2O_3$ may be 0.1% by mass or more, 0.5% by mass or more, 1% by mass or more, 5% by mass or more, 10% by mass or more, 15% by mass or more, 20% by mass or more, 22.5% by mass or more, 25% by mass or more, 27% by mass or more, 27.5% by mass or more, 28% by mass or more, 29% by mass or more, 30% by mass or more, more than 30% by mass, 30.5% by mass or more, 31% by mass or more, 31.5% by mass or more, or 32% by mass or more. From these viewpoints, the content of $La_2O_3$ may be 0 to 40% by mass or the like.

From the viewpoint of easily obtaining excellent devitrification resistance and the like, the core glass may contain ZnO (the content may be more than 0% by mass). ZnO may not be contained (the content may be 0% by mass), and the content of ZnO may be in the following range based on the entire core glasses. From the viewpoint of easily maintaining a high content of other components that contribute to the improvement of radiation blocking performance, the content of ZnO may be 10% by mass or less, 8% by mass or less, 7% by mass or less, 6% by mass or less, 5% by mass or less, less than 5% by mass, 4% by mass or less, 3.5% by mass or less, 3.3% by mass or less, 3.2% by mass or less, 3% by mass or less, 2% by mass or less, 1% by mass or less, or less than 1% by mass. From these viewpoints, the content of ZnO may be 0 to 10% by mass or the like.

The core glass may contain $Nb_2O_5$ (the content may be more than 0% by mass) and may not contain $Nb_2O_5$ (the content may be 0% by mass). The content of $Nb_2O_5$ may be in the following range based on the entire core glasses. From the viewpoint of easily obtaining excellent devitrification resistance, the content of $Nb_2O_5$ may be 16% by mass or less, 15% by mass or less, 12% by mass or less, 10% by mass or less, 8% by mass or less, 7% by mass or less, 6% by mass or less, 5% by mass or less, less than 5% by mass, 4% by mass or less, or 3.5% by mass or less. From the viewpoint of easily increasing the refractive index, the content of $Nb_2O_5$ may be 0.1% by mass or more, 0.5% by mass or more, 1% by mass or more, more than 1% by mass, 1.5% by mass or more, 2% by mass or more, more than 2% by mass, 2.5% by mass or more, 3% by mass or more, more than 3% by mass, 3.25% by mass or more, or 3.5% by mass or more. From these viewpoints, the content of $Nb_2O_5$ may be 0 to 10% by mass or the like.

The core glass may contain a network former (NWF) oxide that forms a network of glass, a network modifier (NWM) oxide that imparts appropriate properties to glass by melting with the NWF oxide, an intermediate oxide having intermediate properties of the NWF oxide and the NWM oxide, or the like. As the NWF oxide, $B_2O_3$, $SiO_2$, $ZrO_2$, and the like are exemplified. As the NWM oxide, $WO_3$, $Gd_2O_3$, $La_2O_3$, $Nb_2O_5$, and the like are exemplified. As the intermediate oxide, $TiO_2$, $ZrO_2$, ZnO, and the like are exemplified.

The content of NWF oxide in the core glass (total amount of NWF oxide) may be in the following range based on the entire core glasses. From the viewpoint of easily improving the radiation blocking performance, the content of NWF oxide may be 40% by mass or less, less than 40% by mass, 35% by mass or less, 30% by mass or less, less than 30% by mass, 29% by mass or less, 28% by mass or less, 27% by mass or less, 26% by mass or less, 25% by mass or less, or 24.5% by mass or less. From the viewpoint of easily obtaining excellent devitrification resistance and the viewpoint of easily reducing the degree of coloration, the content of NWF oxide may be 10% by mass or more, 15% by mass or more, 20% by mass or more, 21% by mass or more, 22% by mass or more, 23% by mass or more, 24% by mass or more, or 24.5% by mass or more. From these viewpoints, the content of NWF oxide may be 10 to 40% by mass or the like.

The content of NWM oxide in the core glass (total amount of NWM oxide) may be in the following range based on the entire core glasses. From the viewpoint of easily maintaining excellent devitrification resistance, the content of NWM oxide may be 80% by mass or less, 79% by mass or less, 78% by mass or less, 77.5% by mass or less, 77% by mass or less, 76.5% by mass or less, 76% by mass or less, or 75.5% by mass or less. From the viewpoint of easily improving the radiation blocking performance, the content of NWM oxide may be 60% by mass or more, 62.5% by mass or more, 65% by mass or more, 66% by mass or more, 67% by mass or more, 68% by mass or more, 69% by mass or more, 70% by mass or more, 70.5% by mass or more, 71% by mass or more, 71.5% by mass or more, 72% by mass or more, 72.5% by mass or more, 73% by mass or more, 73.5% by mass or more, 74% by mass or more, 74.5% by mass or more, 75% by mass or more, or 75.5% by mass or more. From these viewpoints, the content of NWM oxide may be 60 to 80% by mass or the like.

The content of intermediate oxides (total amount of intermediate oxides) in the core glass may be in the following range based on the entire core glasses. From the viewpoint of easily increasing the content of NWM oxide and the viewpoint of easily adjusting the refractive index (for example, easily suppressing an excessive increase in refractive index), the content of the intermediate oxide may be 20% by mass or less, 17.5% by mass or less, 15% by mass or less, 13% by mass or less, 12.5% by mass or less, 12% by mass or less, 11% by mass or less, 10% by mass or less, 9% by mass or less, 8.5% by mass or less, 8% by mass or less, 7% by mass or less, 6% by mass or less, 5% by mass or less, 4% by mass or less, 3% by mass or less, or 2.5% by mass or less. From the viewpoint of easily obtaining excellent devitrification resistance and the viewpoint of easily obtaining excellent chemical durability, the content of the intermediate oxide may be 0% by mass or more, more than 0% by mass, 0.5% by mass or more, 1% by mass or more, more than 1% by mass, 1.5% by mass or more, 2% by mass or more, more than 2% by mass, 2.25% by mass or more, or 2.5% by mass or more. From these viewpoints, the content of the intermediate oxide may be 0 to 20% by mass or the like.

The core glass may contain $CeO_2$ and may not contain $CeO_2$. The content of $CeO_2$ in the core glass may be 0 to 3% by mass, and may be more than 0% by mass and 3% by mass or less based on the entire core glasses. When the core glass contains $CeO_2$, it is easy to obtain the effect of reducing the coloration of the glass due to X-ray exposure. When the content of $CeO_2$ in the core glass is 3% by mass or less, the shift of the absorption edge in the ultraviolet region to the visible region of the glass to the long wavelength side can be easily suppressed, and the decrease in visible light transmission can be easily suppressed.

The core glass may contain constituent components other than the above-described oxides. As such other constituent components, $Bi_2O_3$, $Ta_2O_5$, BaO, FeO, $Co_2O_3$, and the like are exemplified. The core glass may contain at least one of these other constituent components (the content may be more than 0% by mass) and may not contain at least one of these other constituent components (the content may be 0% by mass). The content of at least one of these other constituent components may be 0.1% by mass or less based on the entire core glass.

The refractive index $n_d$ of the d-line in the core glass is 1.88 or less and may be in the following range. The $n_d$ of the core glass may be 1.87 or less, 1.865 or less, 1.86 or less, 1.855 or less, 1.85 or less, 1.849 or less, 1.848 or less, 1.847 or less, 1.846 or less, 1.845 or less, 1.844 or less, 1.8438 or less, 1.8436 or less, 1.8434 or less, or 1.8433 or less. The $n_d$ of the core glass may be 1.8 or more, 1.81 or more, 1.82 or more, 1.83 or more, 1.835 or more, or 1.84 or more. From these viewpoints, the $n_d$ of the core glass may be 1.8 to 1.88 or the like.

The transition point of the core glass may be in the following range. The transition point may be 680° C. or less, 679° C. or less, 678° C. or less, 675° C. or less, 674° C. or less, or 673° C. or less. The transition point may be 560° C. or more, 580° C. or more, 600° C. or more, 620° C. or more, 630° C. or more, 640° C. or more, 645° C. or more, 650° C. or more, 655° C. or more, 660° C. or more, 665° C. or more, 668° C. or more, or 670° C. or more. From these viewpoints, the transition point may be 560 to 680° C. or the like.

The yield point of the core glass may be in the following range. The yield point may be 720° C. or less, 718° C. or less, 716° C. or less, 714° C. or less, 712° C. or less, 710° C. or less, 709° C. or less, or 708° C. or less. The yield points may be 610° C. or more, 620° C. or more, 630° C. or more, 640° C. or more, 650° C. or more, 660° C. or more, 670° C. or more, 680° C. or more, 685° C. or more, 688° C. or more, 689° C. or more, 690° C. or more, 691° C. or more, 693° C. or more, 695 or more, 697° C. or more, 699° C. or more, 700° C. or more, or 705° C. or more. From these viewpoints, the yield point may be 610 to 720° C., 610 to 710° C., or the like.

The linear thermal expansion coefficient of the core glass may be in the following range (unit: $\times 10^{-7}$/° C.). The linear thermal expansion coefficient may be 95 or less, 92 or less, 90 or less, 87 or less, 85 or less, 84 or less, 83 or less, 82 or less, 81 or less, or 80 or less. The linear thermal expansion coefficient may be 70 or more, 72 or more, 74 or more, 75 or more, 76 or more, 77 or more, 78 or more, 79 or more, or 80 or more. From these viewpoints, the linear thermal expansion coefficient may be 70 to 95, 70 to 90, or the like. As the linear thermal expansion coefficient, for example, a linear thermal expansion coefficient in a temperature range of 100 to 300° C. can be used.

The density of the core glass may be in the following range (unit: $g/cm^3$). Density may be 5.5 or less, 5.45 or less, 5.4 or less, 5.35 or less, 5.3 or less, 5.25 or less, 5.2 or less, 5.19 or less, or 5.18 or less. The density may be 5 or more, 5.05 or more, 5.1 or more, or 5.15 or more. From these viewpoints, the density may be 5 to 5.5 or the like.

A scintillator panel of the present embodiment includes a fiber optic plate of the present embodiment and a scintillator disposed on the fiber optic plate. The fiber optic plate and the scintillator may be in contact with each other.

The scintillator may contain cesium iodide and may contain the cesium iodide as a main component. Further, the scintillator may contain gadolinium oxysulfide and may contain the gadolinium oxysulfide as a main component. The scintillator may contain thallium, sodium, terbium, praseodymium or the like as an activator in addition to the cesium iodide or the gadolinium oxysulfide. The scintillator may include a columnar crystal (for example, a columnar crystal containing cesium iodide), and may have a structure in which a plurality of columnar crystals is disposed. The columnar crystal may have a root on the side of the fiber optic plate. The thickness of the scintillator is, for example, 50 to 1000 μm or 80 to 750 μm.

The scintillator panel of the present embodiment may have a protective film covering at least a portion of the side (radiation incident side, for example, the surface of the scintillator on the radiation incident side) opposite to the fiber optic plate in the scintillator. Accordingly, deliquescence can be suppressed when the scintillator has a deliquescent property. The protective film can cover a portion or all of the side oppose to the fiber optic plate in the scintillator. As the constituent material of the protective film, an organic film made of polyparaxylylene or the like; an inorganic film made of a metal, an oxide thereof or the like; and a hybrid film of the above-described organic film and inorganic film, or the like is exemplified.

The radiation detector of the present embodiment includes a radiation irradiator (for example, an X-ray irradiator or an electron beam irradiator), an imaging device, and a scintillator panel of the present embodiment. The scintillator panel is disposed between the radiation irradiator and the imaging device. In the scintillator panel, the scintillator is disposed on the side of the radiation irradiator (the light receiving surface side of the scintillator panel). The fiber optic plate of the scintillator panel and the imaging device may be in contact with each other. As the imaging device, a solid-state imaging device can be used.

FIG. 1 is a cross-sectional view schematically illustrating an example (X-ray detector) of a radiation detector. A radiation detector 100 illustrated in FIG. 1 includes a solid-state imaging device 110 and a scintillator panel 120. In the radiation detector 100, an X-ray irradiator (radiation irradiator) 130 for irradiating X-ray XL, an object (subject, imaging target, inspection target, or the like) 140, the scintillator panel 120, and the solid-state imaging device 110 are disposed in this order. The scintillator panel 120 is disposed on a light receiving surface 110*a* side of the solid-state imaging device 110. The scintillator panel 120 includes a fiber optic plate 122 and a scintillator 124 disposed on the fiber optic plate 122. The scintillator 124 is disposed on the light receiving surface side of the scintillator panel 120 and converts the radiation (for example, X-ray) incident on the scintillator 124 into visible light or the like.

The object 140 is irradiated with the X-ray XL from the X-ray irradiator 130, and thus, absorption, scattering, diffraction, and the like occur in the object 140. Thereafter, the light traveling from the object 140 toward the scintillator 124 of the scintillator panel 120 is incident on the scintillator 124. Most of the incident light with respect to the scintillator 124 is converted into visible light VL or the like, but a portion of the incident light penetrates the scintillator 124 without being converted and travels toward the fiber optic plate 122 side. In the radiation detector 100, by allowing the fiber optic plate 122 to absorb the light penetrating the scintillator 124 without being converted by the scintillator 124 in this manner, the irradiation of the solid-state imaging device 110 with the X-ray XL can be suppressed. Accordingly, digital imaging can be performed while suppressing the occurrence of problems (increase in dark current, noise, or the like, occurrence of white spots in the output image, and the like) caused by the solid-state imaging device 110 being exposed to radiation.

The X-ray irradiator 130 is not particularly limited as long as the X-ray irradiator 130 can irradiate X-rays. The tube voltage of the X-ray irradiator may be 25 KVp or more, 30 KVp or more, 35 KVp or more, 40 KVp or more, 45 KVp or more, 50 KVp or more, 55 KVp or more, 60 KVp or more, 65 KVp or more, 70 KVp or more, 75 KVp or more, or 80 KVp or more. The tube voltage of the X-ray irradiator may be 130 KVp or less, 120 KVp or less, 110 KVp or less, 100 KVp or less, 90 KVp or less, 85 KVp or less, 80 KVp or less, 75 KVp or less, 70 KVp or less, 65 KVp or less, 60 KVp or less, 50 KVp or less, 45 KVp or less, 40 KVp or less, or 35 KVp or less. From these viewpoints, the tube voltage of the X-ray irradiator may be 25 to 130 KVp. As the solid-state imaging device 110, a CCD image sensor, a CMOS image sensor, and the like are exemplified. The scintillator 124 of the scintillator panel 120 contains, for example, cesium iodide as a main component and has a columnar crystal structure having a root on the side of the fiber optic plate.

Figure 2:
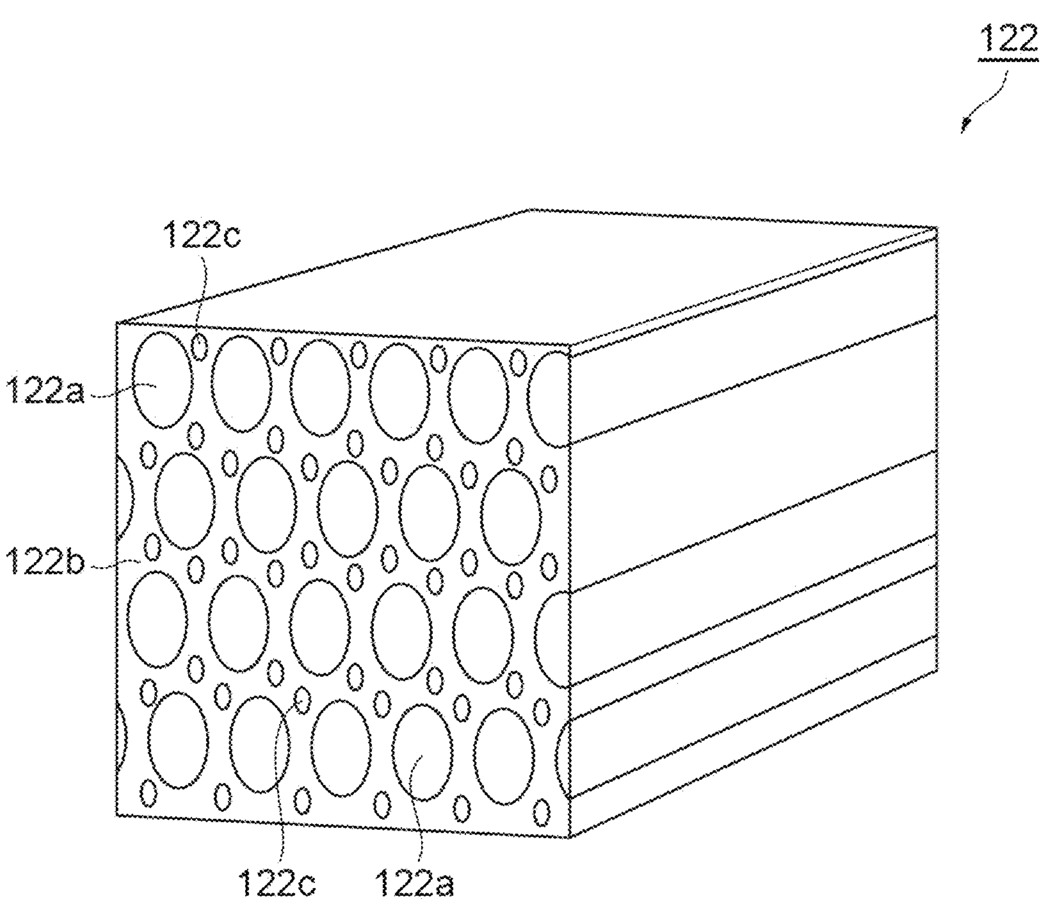
FIG. 2 is an enlarged perspective view illustrating an internal structure of a fiber optic plate of an embodiment of the present invention.

FIG. 2 is an enlarged perspective view illustrating an internal structure of the fiber optic plate. The fiber optic plate 122 includes a plurality of core glasses 122*a*, a clad glass 122*b* covering each of the core glasses 122*a*, and a light-absorbing glass 122*c* disposed between the plurality of core glasses 122*a*. The clad glass 122*b* may be separate from the core glass 122*a* and may be integrated with the core glass 122*a*.

The core glass 122*a* is a fibrous member (long member) and is aligned and juxtaposed in a direction intersecting the axial direction. The core glass 122*a* penetrates from one surface to the other surface of the fiber optic plate 122. The core glass 122*a* can propagate light such as visible light incident from one end (end on the side of one surface of the fiber optic plate 122) to the other end (end on the side of the other surface of the fiber optic plate 122) while blocking X-rays.

The length of the core glass 122*a* (length in the axial direction, the thickness of the fiber optic plate 122) is, for example, 0.1 to 250. The diameter of the core glass 122*a* is, for example, 0.001 to 0.05 mm. The cross section of the core glass 122*a* in the direction intersecting the axial direction has, for example, a circular shape.

The clad glass 122*b* covers each outer peripheral portion of the core glass 122*a*. The length of the core glass 122*a* is equivalent to the length of the clad glass 122*b*. The cross section of the clad glass 122*b* in the direction intersecting the axial direction has, for example, an annular shape. The clad glass 122*b* can contain a network-forming oxide, a network-modified oxide, an intermediate oxide, or the like. The clad glass 122*b* may have a lower refractive index than the core glass 122*a*.

The light-absorbing glass 122*c* is disposed between the plurality of core glasses 122*a*. The light-absorbing glass 122*c* is a long member. The light-absorbing glass 122*c* may have an absorbent property of absorbing light (stray light) leaking from the core glass 122*a* and the clad glass 122*b*. The light-absorbing glass 122*c* may be formed of a glass composition. The glass composition of the light-absorbing glass 122*c* may contain $SiO_2$ as a main component and may contain $Fe_2O_3$ or the like. The diameter of the light-absorbing glass is not particularly limited, and as illustrated in FIG. 2, the diameter of the light-absorbing glass may be smaller than the diameter of the core glass 122*a* and may be equivalent to the diameter of the core glass 122*a*. The light-absorbing glass may be disposed between the plurality of core glasses and may be disposed at the position of a portion of the core glass among the core glasses 122*a* in FIG. 2. In this case, the light-absorbing glass 122*c* illustrated in FIG. 2 may not be disposed.

The electron microscope (transmission electron microscope) of the present embodiment includes an electron beam source, an electron optical system, a sample mounting part, a scintillator panel of the present embodiment, and an imaging device. The electron beam source emits an electron beam. The electron optical system irradiates a sample with electron beams emitted from the electron beam source. The sample mounting part holds the sample. The sample mounting part is disposed between the electron beam source and the scintillator panel. The scintillator panel is disposed between the electron beam source and the imaging device. In the scintillator panel, the scintillator is disposed on the side of the electron beam source. In the electron microscope of the present embodiment, the electron beam penetrating through or being scattered in the sample among the electron beams emitted from the electron beam source is converted into an optical image by the scintillator of the scintillator panel, and the optical image is captured by the imaging device. As the imaging device, a solid-state imaging device can be used. In the electron microscope of the present embodiment, even when the electron beam penetrating through or being scattered in the sample penetrates the scintillator, by blocking the electron beam with the fiber optic plate, the optical image can be captured by the imaging device while suppressing problems caused by the electron beam penetrating the scintillator.

Figure 3:
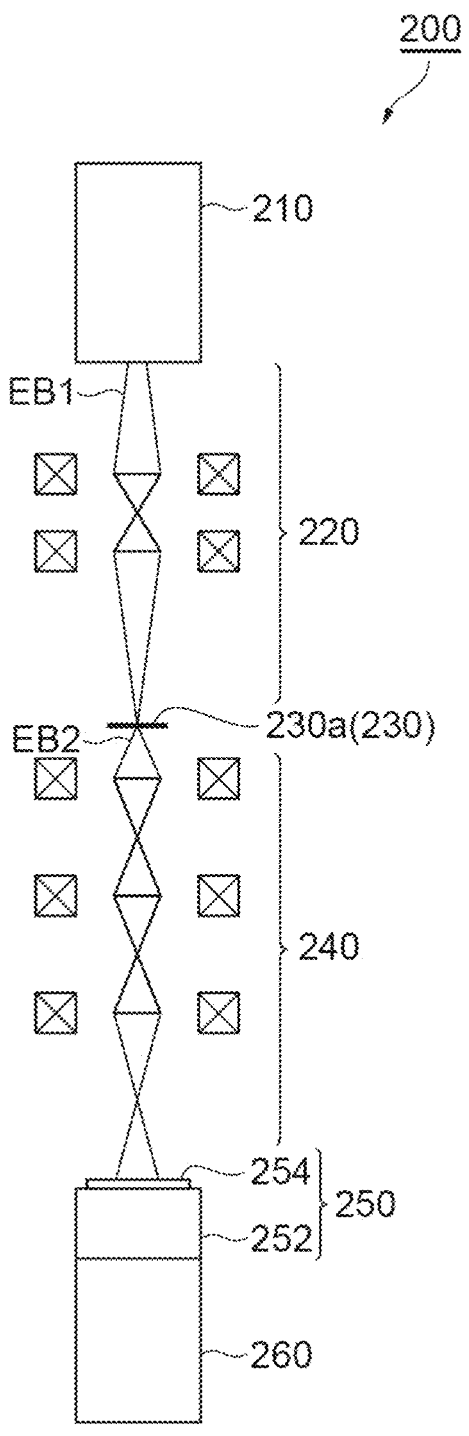
FIG. 3 is a view schematically illustrating an electron microscope of an embodiment of the present invention.

FIG. 3 is a view schematically illustrating an example of an electron microscope (transmission electron microscope). An electron microscope 200 illustrated in FIG. 3 includes an electron gun (electron beam source) 210, an electron optical system 220, a sample mounting part 230, an electron optical system 240, a scintillator panel 250, and a solid-state imaging device 260 in this order. The scintillator panel 250 includes a fiber optic plate 252 and a scintillator 254 disposed on the fiber optic plate 252. The scintillator panel 250 is disposed on the light receiving surface side of the solid-state imaging device 260. The scintillator 254 is disposed on the light receiving surface side of the scintillator panel 250.

The electron gun 210 emits an electron beam EB1. The electron optical system 220 irradiates a sample 230*a* of the sample mounting part 230 with the electron beams EB1 emitted from the electron gun 210. Among the electron beams EB1, an electron beam EB2 penetrating through or being scattered in the sample 230*a* is focus-adjusted by the electron optical system 240 to be incident on the scintillator 254 and is converted into an optical image by the scintillator 254. The optical image including the information of the sample 230*a* can be captured by the solid-state imaging device 260. In the electron microscope 200, even when the electron beam EB2 penetrating through or being scattered in the sample 230*a* penetrates the scintillator 254, by blocking the electron beam EB2 with the fiber optic plate 252, it is possible to capture the optical image by the solid-state imaging device 260 while suppressing problems caused by the electron beam EB2 penetrating the scintillator 254.

According to the present embodiment, it is possible to provide a radiation blocking method of blocking at least a portion (a portion or all) of radiations directed to an imaging device by a fiber optic plate, when an object (a subject, an imaging target, an inspection target, or the like) is irradiated with the radiations from a radiation irradiator in a state where the object is disposed between the radiation irradiator and a scintillator in the radiation detector of the present embodiment. According to the radiation blocking method of the present embodiment, by using a fiber optic plate including a core glass having a small degree of coloration and an appropriate refractive index, it is possible to ensure excellent performance in an optical device while improving radiation blocking performance. In the radiation blocking method of the present embodiment, in the radiation measurement for detecting or imaging the radiation penetrating or being absorbed, scattered, or diffracted by the object, the radiation directed to an imaging device may be blocked by the fiber optic plate. The radiation blocking method of the present embodiment may be an X-ray blocking method of blocking at least a portion (a portion or all) of X-rays directed to the imaging device by the fiber optic plate when an object is irradiated with the X-rays from the radiation irradiator in a state where the object is disposed between the radiation irradiator and the scintillator in the radiation detector of the present embodiment. The radiation blocking method of the present embodiment may be an electron beam blocking method of blocking at least a portion (a portion or all) of electron beams directed to the imaging device by the fiber optic plate when an object is irradiated with the electron beams from the radiation irradiator in a state where the object is disposed between the radiation irradiator and the scintillator in the radiation detector of the present embodiment.

The present embodiment can be used, for example, for various sensors such as an image sensor, various cameras, electron microscopes, and the like. The present embodiment can be used for an area sensor or a line sensor. The present embodiment can be used in the medical and dental imaging fields, battery inspection (finished product inspection, in-process inspection, material inspection, or the like), electronic board inspection, insulating material inspection, electronic component and electronic device inspections, resin inspection, food inspection, and the like.

EXAMPLES

Hereinafter, the contents of the present invention will be described in more detail with reference to Examples and Comparative Examples, but the present invention is not limited to the following Examples.

<Manufacturing of Glass Composition>

Various oxides containing the constituent elements of the glass compositions having the compositions listed in Tables 1 to 4 were sufficiently mixed to obtain a mixture. Next, after inserting the mixture into a platinum crucible, the mixture was dissolved by performing heating to 1100 to 1500° C. using an electric furnace. At that time, clarification and homogenization were performed by appropriately stirring. Then, by casting in a mold preheated at an appropriate temperature and then slowly cooling to remove distortion, the glass composition was obtained. In Tables 1 to 4, the blank portions in the content column denote that the material is not used (0% by mass).

<Physical Property Evaluation>

The transition point (Tg), yield point (At), and linear thermal expansion coefficient ($\alpha$) of the glass composition are measured using a thermal expansion meter (TD: Thermo Dilatometer, manufactured by Mac Science Co., Ltd., trade name: TD5000S). The density was measured using "ED-120T" manufactured by Mirage Trading Co., Ltd. in accordance with "JIS Z 8807:2012 Methods of measuring density and specific gravity of solid". The refractive index (d line) was measured in accordance with "JIS B 7071-2:2018 Measuring method for refractive index of optical glass—Part 2: Vee block refractometers method" using "KPR-2000" manufactured by Carnew Optical Industry Co., Ltd. Physical properties other than the refractive index (d line) were measured only for Examples. The refractive index (d line) was measured only for Examples and Comparative Examples 1 and 2. The measurement results are listed in Tables 1 to 4.

Evaluation of Degree of Coloration>

The glass compositions of Examples and Comparative Examples were visually observed, and the degree of coloration was evaluated based on the following criteria. The results are listed in Tables 1 to 4.

A: not colored

B: slightly colored

C: colored

D: strongly colored

<Evaluation of Devitrification Resistance>

The glass composition of Example was melted in an electric furnace for one hour, and after that, the melt was taken out from the electric furnace. When the stirring of the melt was started and the stirring was performed until the melt was solidified, the state of the glass compositions was visually observed, and the devitrification resistance was evaluated based on the following criteria. The results are listed in Tables 1 to 3.

A: not devitrified but vitrified

B: slightly devitrified but vitrified

C: devitrified but vitrified

D: not vitrified (crystallized)

<Manufacturing of Fiber Optic Plate>

A core glass was manufactured using the glass compositions of Example 17 and Comparative Example 1. After coating the core glass with clad glass, a single fiber was manufactured by performing heating to 810° C. and performing drawing. After manufacturing a single fiber bundle by combining 61 single fibers, a multi-fiber base material was manufactured by inserting a light-absorbing glass into a gap of the single fiber bundle. Next, the multi-fiber base material was heated to 825° C. to manufacture a multi-fiber. A multi multi-fiber base material was manufactured by combining 397 multi-fibers. Next, the multi multi-fiber base material was heated to 780° C. to manufacture a multi multi-fiber. Next, an ingot was manufactured by combining tens of thousands of multi multi-fibers and then heating and fusing at 700° C. By polishing the ingot, a 30 mm×20 mm fiber optic plate for an X-ray image sensor and a 250 mm×7 mm fiber optic plate for an X-ray TDI camera were obtained.

<Manufacturing of Scintillator Panel>

A scintillator panel including a scintillator having a thickness of 120 μm was manufactured by depositing a composition containing cesium iodide as a main component on one surface of the above-described fiber optic plate.

<Manufacturing of X-Ray Image Sensor>

By adhering CMOS (manufactured by HAMAMATSU PHOTONICS K.K., trade name: S11680-71) to the fiber optic plate of the above-described scintillator panel, an X-ray image sensor having a stacked structure of CMOS/fiber optic plate/scintillator was obtained. When the number of white spots in the output image was evaluated by 220 μGy irradiation at an X-ray tube voltage of 70 kVp, the number of white spots was 434 in Comparative Example 1 and 271 in Example 17, and thus, it was confirmed that the radiation exposure of CMOS caused by X-rays was suppressed. Even when X-ray image sensors are manufactured in the same manner as in Example 17 using the glass compositions of Examples other than Example 17, the radiation exposure of CMOS can be suppressed as compared with Comparative Example 1.

<Manufacturing of X-Ray TDI Camera>

Figure 4:
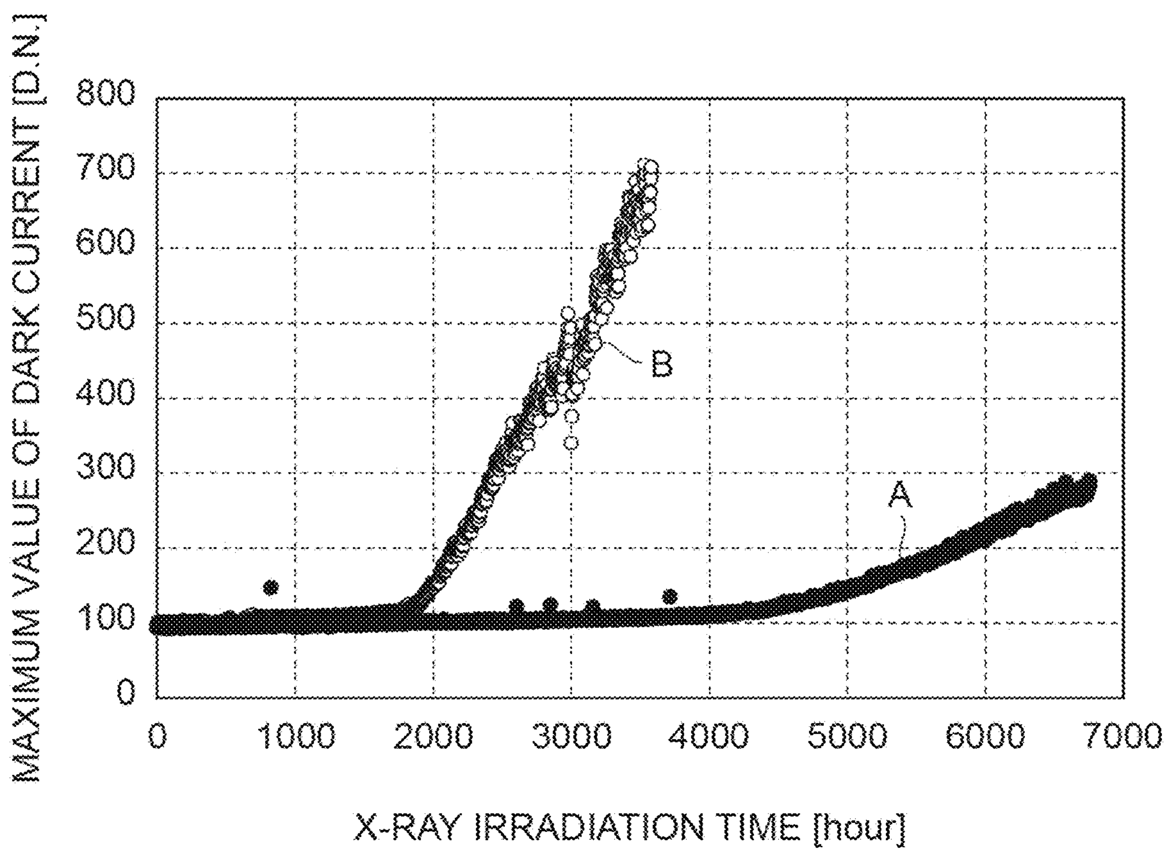
FIG. 4 is a view illustrating an evaluation result of life performance in Example.

By adhering a CCD (manufactured by HAMAMATSU PHOTONICS K.K., trade name: C13100-321) to the fiber optic plate of the above-described scintillator panel, an X-ray TDI camera having a stacked structure of a CCD/fiber optic plate/scintillator was obtained. The life performance of the camera was evaluated at the X-ray tube voltage of 130 kVp and the current of 2.4 mA. The evaluation result of the life performance is illustrated in FIG. 4 (unit of the vertical axis (maximum value of dark current): D.N. (Digital Number) and unit of the horizontal axis (X-ray irradiation time): time (hour)). As illustrated in FIG. 4, it was confirmed that, although the maximum value of the dark current increases in accordance with the X-ray irradiation, in Example 17 (reference numeral A), the increase in dark current in accordance with the X-ray irradiation was suppressed and the life performance was improved as compared with Comparative Example 1 (reference numeral B). Even when an X-ray TDI camera is manufactured in the same manner as in Example 17 using the glass compositions of Examples other than Example 17, the life performance can be improved as compared with Comparative Example 1.

TABLE 1

| | | Example | | | | | | | |
|---|---|---|---|---|---|---|---|---|---|
| | | 1 | 2 | 3 | 4 | 5 | 6 | 7 | 8 |
| Content [% by mass] | $TiO_2$ | 7.0 | 4.1 | | | | | | |
| | $B_2O_3$ | 15.8 | 15.0 | 15.5 | 15.5 | 15.5 | 18.0 | 15.5 | 18.5 |
| | $WO_3$ | 2.2 | 7.3 | 10.0 | 10.0 | 10.0 | 10.0 | 10.0 | 10.0 |
| | $SiO_2$ | 5.5 | 5.2 | 6.0 | 6.0 | 6.0 | 3.5 | 6.0 | 3.5 |
| | $Gd_2O_3$ | 34.8 | 33.0 | 25.0 | 28.0 | 25.0 | 25.0 | 25.0 | 25.0 |
| | $ZrO_2$ | 2.3 | 2.2 | 2.5 | 2.5 | 4.5 | 5.5 | 5.5 | 7.5 |
| | $La_2O_3$ | 29.2 | 27.7 | 32.0 | 32.0 | 27.0 | 32.0 | 32.0 | 32.0 |
| | ZnO | 3.3 | 3.2 | 6.0 | 6.0 | 6.0 | 3.0 | 3.0 | |
| | $Nb_2O_5$ | | 2.3 | 3.0 | | 6.0 | 3.0 | 3.0 | 3.5 |
| | $Bi_2O_3$ | | | | | | | | |
| | $Ta_2O_5$ | | | | | | | | |
| Refractive index: d line ($n_d$) | | 1.86896 | 1.86875 | 1.83939 | 1.83062 | 1.84758 | 1.84895 | 1.84509 | 1.85021 |
| Transition point [° C.] | | 672 | 669 | 648 | 652 | 648 | 659 | 666 | 679 |
| Yield point [° C.] | | 717 | 712 | 690 | 696 | 692 | 700 | 708 | 715 |
| Linear thermal expansion coefficient [$\times10^{-7}$/° C.] | | 84 | 82 | 81 | 84 | 77 | 82 | 78 | 80 |
| Density [g/cm$^3$] | | 5.15 | 5.24 | 5.19 | 5.26 | 5.10 | 5.20 | 5.15 | 5.12 |
| Degree of coloration | | A | A | A | A | A | A | A | A |
| Devitrification resistance | | D | D | C | D | D | D | D | C |

TABLE 2

| | | Example | | | | | | | |
|---|---|---|---|---|---|---|---|---|---|
| | | 9 | 10 | 11 | 12 | 13 | 14 | 15 | 16 |
| Content [% by mass] | $TiO_2$ | | | | | | | | |
| | $B_2O_3$ | 15.5 | 18.5 | 18.5 | 18.5 | 18.5 | 16.0 | 22.0 | 18.5 |
| | $WO_3$ | 16.0 | 13.5 | 10.0 | 12.5 | 12.5 | 12.5 | 12.5 | 12.5 |
| | $SiO_2$ | 6.0 | 3.5 | 3.5 | 3.5 | 3.5 | 6.0 | | 3.5 |
| | $Gd_2O_3$ | 25.0 | 25.0 | 25.0 | 25.0 | 25.0 | 25.0 | 25.0 | 27.5 |
| | $ZrO_2$ | 2.5 | 7.5 | 7.5 | 5.0 | 2.5 | 2.5 | 2.5 | 2.5 |
| | $La_2O_3$ | 32.0 | 32.0 | 32.0 | 32.0 | 32.0 | 32.0 | 32.0 | 32.0 |
| | ZnO | | | 3.5 | | | | | |
| | $Nb_2O_5$ | 3.0 | | | 3.5 | 6.0 | 6.0 | 6.0 | 3.5 |
| | $Bi_2O_3$ | | | | | | | | |
| | $Ta_2O_5$ | | | | | | | | |
| Refractive index: d line ($n_d$) | | 1.84469 | 1.84012 | 1.83857 | 1.84469 | 1.84900 | 1.84940 | 1.84826 | 1.83853 |
| Transition point [° C.] | | 675 | 675 | 659 | 672 | 667 | 675 | 661 | 670 |
| Yield point [° C.] | | 716 | 713 | 698 | 710 | 707 | 714 | 696 | 709 |
| Linear thermal expansion coefficient [$\times10^{-7}$/° C.] | | 79 | 80 | 79 | 78 | 81 | 78 | 78 | 79 |
| Density [g/cm$^3$] | | 5.21 | 5.16 | 5.16 | 5.13 | 5.12 | 5.14 | 5.09 | 5.15 |
| Degree of coloration | | A | A | A | A | A | A | A | A |
| Devitrification resistance | | D | D | D | C | C | D | C | C |

TABLE 3

| | | Example | | | | |
|---|---|---|---|---|---|---|
| | | 17 | 18 | 19 | 20 | 21 |
| Content [% by mass] | $TiO_2$ | | | | | |
| | $B_2O_3$ | 18.5 | 18.5 | 18.5 | 22.0 | 21.0 |
| | $WO_3$ | 15.0 | 18.5 | 17.5 | 15.0 | 15.0 |

TABLE 3-continued

| | | | | | | |
|---|---|---|---|---|---|---|
| | $SiO_2$ | 3.5 | 3.5 | 3.5 | | 1.0 |
| | $Gd_2O_3$ | 25.0 | 25.0 | 25.0 | 25.0 | 25.0 |
| | $ZrO_2$ | 2.5 | 2.5 | | 2.5 | 2.5 |
| | $La_2O_3$ | 32.0 | 32.0 | 32.0 | 32.0 | 32.0 |
| | ZnO | | | | | |
| | $Nb_2O_5$ | 3.5 | | 3.5 | 3.5 | 3.5 |
| | $Bi_2O_3$ | | | | | |
| | $Ta_2O_5$ | | | | | |
| Refractive index: d line ($n_d$) | | 1.84323 | 1.84628 | 1.83344 | 1.84121 | 1.84000 |
| Transition point [° C.] | | 672 | 664 | 665 | 662 | 661 |
| Yield point [° C.] | | 708 | 695 | 702 | 692 | 696 |
| Linear thermal expansion coefficient [$\times 10^{-7}$/° C.] | | 80 | 82 | 79 | 79 | 79 |
| Density [g/cm$^3$] | | 5.16 | 5.32 | 5.18 | 5.14 | 5.12 |
| Degree of coloration | | A | A | A | A | A |
| Devitrification resistance | | A | D | C | C | C |

| | | Example | | | |
|---|---|---|---|---|---|
| | | 22 | 23 | 24 | 25 |
| Content [% by mass] | $TiO_2$ | | | | |
| | $B_2O_3$ | 20.0 | 20.5 | 19.5 | 19.0 |
| | $WO_3$ | 15.0 | 15.0 | 15.0 | 15.0 |
| | $SiO_2$ | 2.0 | 1.5 | 2.5 | 3.0 |
| | $Gd_2O_3$ | 25.0 | 25.0 | 25.0 | 25.0 |
| | $ZrO_2$ | 2.5 | 2.5 | 2.5 | 2.5 |
| | $La_2O_3$ | 32.0 | 32.0 | 32.0 | 32.0 |
| | ZnO | | | | |
| | $Nb_2O_5$ | 3.5 | 3.5 | 3.5 | 3.5 |
| | $Bi_2O_3$ | | | | |
| | $Ta_2O_5$ | | | | |
| Refractive index: d line ($n_d$) | | 1.84229 | 1.84013 | 1.84878 | 1.83982 |
| Transition point [° C.] | | 666 | 660 | 664 | 668 |
| Yield point [° C.] | | 701 | 692 | 699 | 703 |
| Linear thermal expansion coefficient [$\times 10^{-7}$/° C.] | | 82 | 83 | 83 | 77 |
| Density [g/cm$^3$] | | 5.15 | 5.13 | 5.21 | 5.13 |
| Degree of coloration | | A | A | A | A |
| Devitrification resistance | | A | C | B | A |

TABLE 4

| | | Comparative Example | | | | | | |
|---|---|---|---|---|---|---|---|---|
| | | 1 | 2 | 3 | 4 | 5 | 6 | 7 |
| Content [% by mass] | $TiO_2$ | 10.5 | 9.9 | 7.2 | 10.0 | | 6.7 | 6.8 |
| | $B_2O_3$ | 17.4 | 16.4 | 16.5 | 14.0 | 15.5 | 15.2 | 15.4 |
| | $WO_3$ | | 7.9 | 8.0 | 7.9 | | | |
| | $SiO_2$ | 6.0 | 3.6 | 5.7 | 5.7 | 6.0 | 5.3 | 5.3 |
| | $Gd_2O_3$ | 25.1 | 23.6 | 23.8 | 23.7 | 25.0 | 22.0 | 22.2 |
| | $ZrO_2$ | 2.5 | 2.4 | 2.4 | 2.4 | 2.5 | 2.2 | 2.2 |
| | $La_2O_3$ | 32.1 | 30.2 | 30.4 | 30.3 | 32.0 | 28.2 | 28.4 |
| | ZnO | 3.7 | 3.4 | 3.5 | 3.5 | 6.0 | 3.2 | 3.2 |
| | $Nb_2O_5$ | 2.7 | 2.6 | 2.6 | 2.6 | 3.0 | 2.4 | 2.4 |
| | $Bi_2O_3$ | | | | | 10.0 | 14.8 | |
| | $Ta_2O_5$ | | | | | | | 14.2 |
| Refractive index: d line ($n_d$) | | 1.88356 | 1.91020 | — | — | — | — | — |
| Degree of coloration | | A | C | B | C | C | D | B |

REFERENCE SIGNS LIST

100: radiation detector, 110, 260: solid-state imaging device, 110*a*: light receiving surface, 120, 250: scintillator panel, 122, 252: fiber optic plate, 122*a*: core glass, 122*b*: clad glass, 122*c*: light-absorbing glass, 124, 254: scintillator, 130: X-ray irradiator (radiation irradiator), 140: object, 200: electron microscope, 210: electron gun (electron beam source), 220: electron optical system, 230: sample mounting part, 230*a*: sample, EB1, EB2: electron beam, VL: visible light, XL: X-ray.

The invention claimed is:

1. A fiber optic plate comprising:

a plurality of core glasses;

a clad glass covering the core glass; and a light-absorbing glass disposed between the plurality of core glasses, wherein a content of $TiO_2$ in the core glass is 7% by mass or less, a content of $B_2O_3$ in the core glass is 15% by mass or more and 19% by mass or less, a content of $SiO_2$ in the core glass is 2 to 3.5% by mass, and a content of $WO_3$ in the core glass is 14 to 17% by mass.

2. The fiber optic plate according to claim 1, wherein the content of $TiO_2$ in the core glass is 0.1% by mass or less.

3. The fiber optic plate according to claim 1, wherein the content of $B_2O_3$ in the core glass is 18.5% by mass or more.

4. The fiber optic plate according to claim 1, wherein a content of $Gd_2O_3$ in the core glass is 25% by mass or less.

5. The fiber optic plate according to claim 1, wherein a content of $ZrO_2$ in the core glass is 2.5% by mass or less.

6. The fiber optic plate according to claim 1, wherein a d-line refractive index $n_d$ of the core glass is 1.85 or less.

7. A scintillator panel comprising:

the fiber optic plate according to claim 1; and a scintillator disposed on the fiber optic plate.

8. The scintillator panel according to claim 7, wherein the scintillator comprises a columnar crystal containing cesium iodide, and the columnar crystal has a root on the side of the fiber optic plate.

9. The scintillator panel according to claim 7, further comprising a protective film covering at least a portion of the scintillator opposite to the fiber optic plate.

10. A radiation detector comprising:

a radiation irradiator;

an imaging device comprising a CCD image sensor or a CMOS image sensor; and the scintillator panel according to claim 7, wherein the scintillator panel is disposed between the radiation irradiator and the imaging device, and the scintillator is disposed on the side of the radiation irradiator in the scintillator panel.

11. An X-ray blocking method of blocking at least a portion of X-rays directed to the imaging device by the fiber optic plate when an object is irradiated with the X-rays from the radiation irradiator in a state where the object is disposed between the radiation irradiator and the scintillator in the radiation detector according to claim 10.

12. An electron beam blocking method of blocking at least a portion of electron beams directed to the imaging device by the fiber optic plate when an object is irradiated with the electron beams from the radiation irradiator in a state where the object is disposed between the radiation irradiator and the scintillator in the radiation detector according to claim 10.

13. An electron microscope comprising:

an electron beam source;

an electron optical system irradiating a sample with electron beams emitted from the electron beam source;

a sample mounting part holding the sample;

the scintillator panel according to claim 7; and an imaging device comprising a CCD image sensor or a CMOS image sensor, wherein the scintillator panel is disposed between the electron beam source and the imaging device, the scintillator is disposed on the side of the electron beam source in the scintillator panel, an electron beam penetrating through or being scattered in the sample among the electron beams is converted into an optical image by the scintillator of the scintillator panel, and the optical image is captured by the imaging device.

* * * * *